(12) United States Patent
Stefik et al.

(10) Patent No.: US 9,213,957 B2
(45) Date of Patent: Dec. 15, 2015

(54) COMPUTER-IMPLEMENTED SYSTEM AND METHOD FOR PROVIDING JUST-IN-TIME LOADING ZONE PARKING

(71) Applicant: Palo Alto Research Center Incorporated, Palo Alto, CA (US)

(72) Inventors: Mark J. Stefik, Portola Valley, CA (US); Ellen Isaacs, San Jose, CA (US); Peter Jarvis, Sunnyvale, CA (US); Robert Thomas Krivacic, San Jose, CA (US); Roger Hoover, San Bruno, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 103 days.

(21) Appl. No.: 13/624,873

(22) Filed: Sep. 21, 2012

(65) Prior Publication Data

US 2014/0089015 A1    Mar. 27, 2014

(51) Int. Cl.

| | |
|---|---|
| *G06Q 10/00* | (2012.01) |
| *G06Q 10/08* | (2012.01) |
| *G06Q 10/02* | (2012.01) |
| *G06Q 50/10* | (2012.01) |
| *G06Q 50/28* | (2012.01) |
| G07B 15/00 | (2011.01) |
| G07B 15/02 | (2011.01) |

(52) U.S. Cl.
CPC .............. *G06Q 10/08* (2013.01); *G06Q 10/025* (2013.01); *G06Q 50/10* (2013.01); *G06Q 50/28* (2013.01)

(58) Field of Classification Search
CPC ..... G07B 15/00; G06Q 10/109; G06Q 10/02; G06Q 30/02; G06Q 30/0264; G06Q 50/12
See application file for complete search history.

(56) References Cited

U.S. PATENT DOCUMENTS

| | | | |
|---|---|---|---|
| 3,349,368 A | 10/1967 | Kates | |
| 4,137,662 A * | 2/1979 | Baumer | ........................... 40/612 |
| 4,310,890 A | 1/1982 | Trehn et al. | |
| 4,356,903 A | 11/1982 | Lemelson et al. | |
| 4,532,418 A | 7/1985 | Meese et al. | |
| 5,266,947 A | 11/1993 | Fujiwara et al. | |

(Continued)

FOREIGN PATENT DOCUMENTS

| | | |
|---|---|---|
| JP | 04335697 | 11/1992 |
| JP | 08022598 | 1/1996 |
| WO | 2004084145 | 9/2004 |

OTHER PUBLICATIONS

Smith et al, "Intelligent Transportation Systems and Truck Parking", Feb. 2005.*

(Continued)

*Primary Examiner* — George Chen
(74) *Attorney, Agent, or Firm* — Patrick J. S. Inouye

(57) ABSTRACT

A computer-implemented method for system and method for providing just-in-time loading zone parking is provided. A next delivery destination for a delivery driver is determined. A just-in-time parking reservation at the next delivery destination is booked. The just-in-time parking reservation includes a parking location and start time. A time of arrival by the delivery driver at the parking location is estimated. An amount of time between the estimated time of arrival and the start time of the just-in-time parking reservation is determined. Parking in the parking location by other drivers is permitted when the estimated time of departure is sufficiently prior to the start time of the just-in-time parking reservation.

11 Claims, 6 Drawing Sheets

(56) References Cited

U.S. PATENT DOCUMENTS

| | | | |
|---|---|---|---|
| 5,432,508 A | 7/1995 | Jackson | |
| 5,570,771 A | 11/1996 | Jacobs | |
| 5,710,557 A | 1/1998 | Schuette | |
| 5,710,743 A | 1/1998 | Dee et al. | |
| 5,740,050 A | 4/1998 | Ward, II | |
| 5,770,845 A | 6/1998 | Hjelmvik | |
| 5,777,951 A | 7/1998 | Mitschele | |
| 5,841,369 A | 11/1998 | Sutton et al. | |
| 5,910,782 A | 6/1999 | Schmitt et al. | |
| 6,078,272 A | 6/2000 | Jacobs et al. | |
| 6,081,205 A | 6/2000 | Williams | |
| 6,081,206 A | 6/2000 | Kielland | |
| 6,102,285 A | 8/2000 | Elias | |
| 6,111,522 A | 8/2000 | Hiltz et al. | |
| 6,188,328 B1 | 2/2001 | Ho | |
| 6,243,028 B1 | 6/2001 | Krygler et al. | |
| 6,243,029 B1 | 6/2001 | Tomer | |
| 6,275,169 B1 | 8/2001 | Krygler et al. | |
| 6,373,401 B2 | 4/2002 | Ho | |
| 6,411,895 B1* | 6/2002 | Lau et al. | 701/425 |
| 6,437,692 B1 | 8/2002 | Petite et al. | |
| 6,459,386 B1 | 10/2002 | Jones | |
| 6,493,676 B1 | 12/2002 | Levy | |
| 6,505,774 B1 | 1/2003 | Fulcher et al. | |
| 6,513,711 B1 | 2/2003 | Hjelmvik | |
| 6,519,329 B1 | 2/2003 | Hjelmvik | |
| 6,577,248 B1 | 6/2003 | Hjelmvik | |
| 6,791,473 B2 | 9/2004 | Kimbria et al. | |
| RE38,626 E | 10/2004 | Kielland | |
| 6,812,857 B1 | 11/2004 | Kassab et al. | |
| 6,816,085 B1 | 11/2004 | Haynes et al. | |
| 6,823,317 B1 | 11/2004 | Ouimet et al. | |
| 6,885,311 B2 | 4/2005 | Howard et al. | |
| 6,927,700 B1 | 8/2005 | Quinn | |
| 6,929,179 B2 | 8/2005 | Fulcher et al. | |
| 7,002,487 B1 | 2/2006 | Montgomery, Sr. | |
| 7,014,355 B2 | 3/2006 | Potter, Sr. et al. | |
| 7,019,670 B2 | 3/2006 | Bahar | |
| 7,123,166 B1 | 10/2006 | Haynes et al. | |
| 7,237,716 B2 | 7/2007 | Silberberg | |
| 7,277,010 B2 | 10/2007 | Joao | |
| RE40,013 E | 1/2008 | Quinn | |
| 7,321,317 B2 | 1/2008 | Nath et al. | |
| 7,382,244 B1 | 6/2008 | Donovan et al. | |
| 7,393,134 B2 | 7/2008 | Mitschele | |
| 7,474,589 B2 | 1/2009 | Showen et al. | |
| 7,579,964 B2 | 8/2009 | Nath et al. | |
| 7,652,593 B1 | 1/2010 | Haynes et al. | |
| 7,667,619 B2 | 2/2010 | Montgomery, Sr. | |
| 7,688,225 B1 | 3/2010 | Haynes et al. | |
| 7,768,426 B2 | 8/2010 | Groft | |
| 7,791,501 B2 | 9/2010 | Ioli | |
| 7,791,503 B2 | 9/2010 | Breed et al. | |
| 7,805,239 B2 | 9/2010 | Kaplan et al. | |
| 7,840,427 B2 | 11/2010 | O'Sullivan | |
| 7,855,935 B1 | 12/2010 | Lauder et al. | |
| 7,900,966 B1 | 3/2011 | Stennett | |
| 8,111,172 B2 | 2/2012 | Morimoto et al. | |
| 8,175,803 B2 | 5/2012 | Caraballo | |
| 8,244,566 B1* | 8/2012 | Coley et al. | 705/7.11 |
| 8,600,800 B2 | 12/2013 | Rowe et al. | |
| 8,688,509 B2 | 4/2014 | Rowe et al. | |
| 2002/0077953 A1 | 6/2002 | Dutta | |
| 2002/0099574 A1* | 7/2002 | Cahill et al. | 705/5 |
| 2003/0055727 A1 | 3/2003 | Walker et al. | |
| 2004/0068433 A1 | 4/2004 | Chatterjee et al. | |
| 2004/0236615 A1 | 11/2004 | Msndy | |
| 2004/0254840 A1 | 12/2004 | Slemmer et al. | |
| 2005/0280555 A1 | 12/2005 | Warner, VI | |
| 2006/0068704 A1 | 3/2006 | Bhakta et al. | |
| 2006/0247848 A1* | 11/2006 | Cheng | 701/200 |
| 2006/0259353 A1 | 11/2006 | Gutmann | |
| 2007/0008181 A1 | 1/2007 | Rollert et al. | |
| 2007/0136128 A1 | 6/2007 | Janacek et al. | |
| 2007/0290888 A1 | 12/2007 | Reif et al. | |
| 2008/0133425 A1 | 6/2008 | Grush | |
| 2008/0136674 A1 | 6/2008 | Jang et al. | |
| 2008/0208680 A1* | 8/2008 | Cho | 705/13 |
| 2009/0125341 A1* | 5/2009 | Somoza et al. | 705/5 |
| 2009/0164635 A1 | 6/2009 | Denker et al. | |
| 2009/0171567 A1 | 7/2009 | Morimoto et al. | |
| 2009/0276236 A1 | 11/2009 | Adamczyk et al. | |
| 2009/0309760 A1 | 12/2009 | Chew | |
| 2010/0030708 A1 | 2/2010 | Ward, II | |
| 2010/0106514 A1 | 4/2010 | Cox | |
| 2010/0328104 A1 | 12/2010 | Groft | |
| 2011/0035261 A1 | 2/2011 | Handler | |
| 2011/0127944 A1 | 6/2011 | Saito et al. | |
| 2011/0131083 A1 | 6/2011 | Redmann et al. | |
| 2011/0140658 A1 | 6/2011 | Outwater et al. | |
| 2011/0193522 A1 | 8/2011 | Uesugi | |
| 2011/0227533 A1 | 9/2011 | Wolfien | |
| 2011/0241619 A1 | 10/2011 | Young et al. | |
| 2011/0246252 A1 | 10/2011 | Uesugi | |
| 2011/0257881 A1* | 10/2011 | Chen et al. | 701/204 |
| 2012/0092190 A1* | 4/2012 | Stefik et al. | 340/932.2 |
| 2012/0112698 A1 | 5/2012 | Yoshimura et al. | |
| 2012/0173292 A1 | 7/2012 | Solomon et al. | |
| 2012/0188101 A1 | 7/2012 | Ganot | |
| 2013/0332509 A1* | 12/2013 | Schwartz et al. | 709/203 |

OTHER PUBLICATIONS

Weinberger et al., US Parking Policies: An Overview of Management Strategies, Institute for Transportation & Development Policy, http://www.streetsblog.org/wp-content/pdf/ITDP_Parking_FullReport.pdf, Feb. 2010, retrieved Jun. 7, 2013.

Geroliminis et al., "A review of green logistics schemes used in cities around the world", UC Berkeley Center of Future Urban transport: A volvo center of excellence, http://escholarship.org/uc/item/4x89p485.pdf, Aug. 1, 2005, retrieved Jun. 19, 2013.

* cited by examiner

COMPUTER-IMPLEMENTED SYSTEM AND METHOD FOR PROVIDING JUST-IN-TIME LOADING ZONE PARKING

FIELD

This application relates in general to motor vehicle parking control and management and, in particular, to a computer-implemented system and method for providing just-in-time loading zone parking.

BACKGROUND

Public roads primarily facilitate traffic. Parking is offered as a secondary benefit incident to vehicle throughway. Local governments typically regulate parking on public roads, whether at curbside, in municipal lots, or on other public property, through a regulatory scheme that promotes public safety and provides revenue generation. The impact of regulated control over on-street parking affects all motorists, as well as urban residents, local businesses, commercial drivers, and other parties that use or rely upon on-street parking. Looking for a parking space wastes time and fuel, contributes to traffic congestion, creates frustration and stress, and increases pollution, while disregarding parking regulations can result in parking tickets, fines, and towing. Still, despite these downsides, parking regulation remains a practical necessity.

Commonly, public parking is controlled through parking restrictions and prohibitions that permit parking on a first-come, first-served basis, with few exceptions, such as allowed by special permit. Parking compliance is regulated through a scheme of fees assessed for fixed intervals of time, after which a motorist is expected to either leave or, if permitted, pay for additional time. Public parking is typically purchased using parking meters assigned to individual parking spaces or through nearby curbside pay stations that collect payment and print a receipt, which must be displayed on the vehicle as proof of payment ("pay and display"); collect payment and provide the parking space number or identifier ("pay and no display"); collect payment and provide a license plate number; as well as other methods of associating proof of payment with use of a parking space, including where payment is transacted by phone or online.

Commercial drivers of delivery vehicles are frequently at odds with regulated parking control. These drivers typically need to park near building entrances during business hours to facilitate loading and unloading of goods. As well, each day, commercial drivers must contend with other motorists in navigating city traffic and finding suitable parking spaces, while concurrently attempting to keep their delivery schedule on-time. When parking is unavailable, these drivers sometimes resort to double parking on the street, which in turn causes traffic congestion. Urban transportation authorities attempt to address the problem of parking for commercial deliveries through traffic and parking regulations and enforcement and by designating loading zones for exclusive use by commercial drivers during set times. However, these measures do not adequately resolve the commercial delivery parking problem.

The core problem is resource allocation. From the perspective of commercial delivery companies, loading zones are too few in number and are too often occupied by other non-commercial vehicles. By necessity, delivery companies are forced to treat illegal parking fines as part of the cost of doing business, which in essence institutionalizes the enforcement, infractions, court process, and traffic congestion occasioned by inadequately apportioned loading zones. From the perspective of city planners, allocating more loading zones cuts down on the parking needed for shopping and other commercial purposes. Furthermore, motorists who are ticketed for misuse of loading zones often misunderstand the meaning of posted commercial loading zone restrictions that can vary by day and hour, require commercial plates or licenses, or involve other complex rules of which the motorist may not be aware. In short, crowded loading zones and traffic congestion reflect an inadequate approach to managing loading zones as a scarce public parking resource.

There is a need for more efficiently managing delivery loading zones in a manner that that makes the parking readily available for commercial drivers on an as-needed basis, while also allowing other drivers to park without interfering with the underlying loading zone use.

SUMMARY

A centralized server-based system and method for managing commercial delivery loading zones. When a delivery vehicle is en route and a short time away from a delivery destination, a loading zone management service disallows other short-term parking in a parking space or set of contiguous spaces located at the delivery location. Availability indicators that show potential parkers that the parking space is reserved as a loading zone. After the delivery vehicle leaves, the service allocates the parking space back to short-term parking.

One embodiment provides a computer-implemented system and method for providing just-in-time loading zone parking. A next delivery destination for a delivery driver is determined. A just-in-time parking reservation at the next delivery destination is booked. The just-in-time parking reservation includes a parking location and start time. A time of arrival by the delivery driver at the parking location is estimated. An amount of time between the estimated time of departure and the start time of the just-in-time parking reservation is determined. Parking in the parking location by other drivers is permitted when the estimated time of arrival is sufficiently prior to the start time of the just-in-time parking reservation.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Mixed Use Parking Infrastructure

Figure 1:
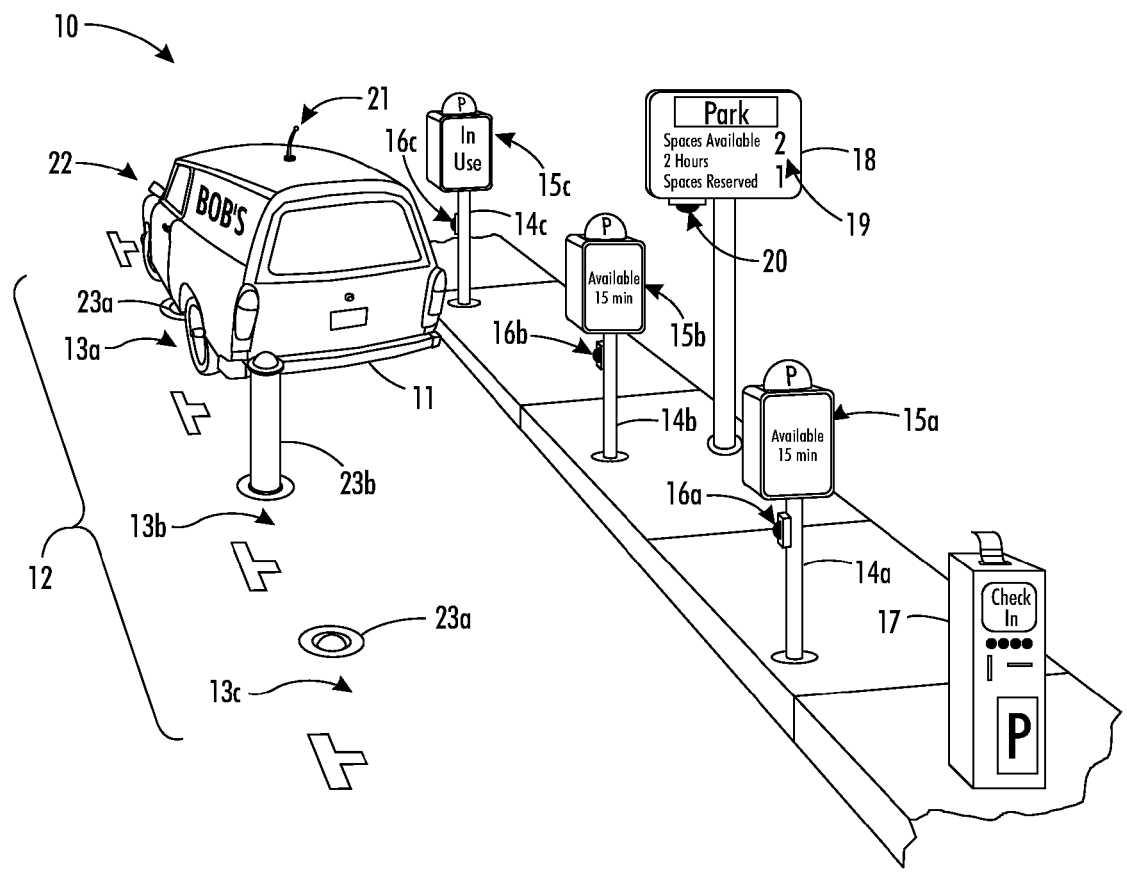
FIG. 1 is a diagram showing a computer-implemented system for providing just-in-time loading zone parking in accordance with one embodiment.

Commercial delivery drivers, in addition to motorists, urban residents, local businesses, and other parties that use or rely upon on-street parking, are able to reserve and use public parking through centrally-managed parking spaces. The centralized servicing of the parking spaces efficaciously controls reserved commercial and short-term parking to facilitate mixed commercial and public parking utilization. FIG. 1 is a diagram showing a computer-implemented system 10 for providing just-in-time loading zone parking in accordance with one embodiment. Individual parking spaces 13a-c can be designated for mixed use, which includes concurrent loading zone and public parking usage. During non-loading zone periods, any motorist can reserve an individual parking space 13a-c for parking a vehicle 11 ahead of time or on-site as a form of "instant" parking reservation, such as described in commonly-assigned U.S. Patent application Publication No.: 2012/0092190 to Stefik et al., pending, and U.S. Patent application Publication No.: 2012/0095792 to Stefik et al., pending, the disclosures of which are incorporated by reference. The same considerations apply if a motorist already parked in one of the parking spaces 13a-c wants to extend the parking time. In a further embodiment, the parking spaces 13a-c are formed into a parking pool 12 in which a motorist can reserve parking, such as described in commonly-assigned U.S. Patent application, entitled, "Computer-Implemented System And Method For Managing Interchangeable Parking Spaces," Ser. No. 13/624,876, filed Sep. 21, 2012, pending, the disclosure of which is incorporated by reference. In a still further embodiment, the parking spaces 13a-c are capable of charging plug-in hybrid and electric vehicles ("EVs") and can be designated for dual use, which includes charging and parking usage by an EV or parking-only usage by any vehicle, such as described in commonly-assigned U.S. Patent application, entitled, "Computer-Implemented System And Method For Managing Interchangeable EV Charging-Capable Parking Spaces," Ser. No. 13/624,883, filed Sep. 21, 2012, pending, the disclosure of which is incorporated by reference. For simplicity, parking, whether controlled by local government or privately owned, and regardless of whether curbside, on a driveway, in cutouts in front of a driveway ("curbcuts"), within a parking lot, or in other physical locations will henceforth be called "on-street parking" or simply "parking."

During loading zone periods, the uses of the parking spaces 13a-c, whether as a commercial loading zone or for public parking, is determined by the state that has been assigned by centralized parking services for the current time period. Each delivery vehicle 11 includes a navigational system 22, such as a global positioning satellite (GPS) device, which allows the vehicle's location to be continually ascertained and used in estimating time of arrival at the driver's next delivery destination. Loading zone parking can be requested on-the-fly whilst a commercial driver is driving a delivery route through "just-in-time" parking reservation requests, as further described below with reference to FIG. 4. Loading zone parking can also be requested ahead of time by a commercial driver through early parking reservation requests, as further described below with reference to FIG. 6. Conventional first-come, first-served on-street public parking is also offered through short-term parking that is provided in between scheduled or just-in-time loading zone uses, as further described below with reference to FIG. 7. All parking is subject to applicable parking restrictions and prohibitions and any current pending parking reservations that may affect the parking spaces 13a-c that will be used to fulfill already-booked reservations, whether just-in-time or early.

Parking support equipment, as variously configured and further described infra, provide the functions needed to reserve and manage loading zone parking. In one embodiment, each parking space 13a-c has an assigned single-space parking meter 14a-c, each of which respectively includes dynamic signage 15a-c for indicating parking availability, such as "Reserved Loading Zone," "Paid" and "Short Term Parking Only," and a vehicle occupancy sensor 16a-c, such as a video or still camera, for detecting vehicle occupancy in the assigned parking space 13a-c. In a further embodiment, dynamically-updated signage 18 located adjacent or near to the parking spaces 13a-c advises motorists of on-street parking availability and duration 19, plus whether any current pending reservations may affect any unoccupied parking spaces 13b-c. The parking advisory displayed by the signage 18 could apply locally to just those parking spaces 13a-c to which the signage is near, to one city block face, to an entire city block, or any other area of parking interest. Ideally, the signage 18 displays the parking advisory large enough to allow motorists to read the information necessary to making a decision on parking without getting out of their vehicles. In addition, a vehicle occupancy sensor 20, such as a video or still camera, collectively measures occupancy of all of the parking spaces 13a-c. In a still further embodiment, the parking services 33 can notify parking enforcement authorities when a motorist has parked in a parking space 13a-c without a reservation, payment or other form of authorization, such as a disabled parking permit. In a still further embodiment, the parking services can physically block or permit access to the parking spaces 13a-c by deploying motorized posts (bollards) 23a-c that rise (bollard 23b) or drop below (bollards 23a, 23c) street level under system control, thereby serving the dual purposes of physically blocking reserved parking spaces 13b and visually reinforcing that parking is not presently permitted.

On-site, motorists can interact with the centralized parking services that handle the parking spaces 13a-c assigned to the parking pool 12 through each parking meter 15a-c or via a centralized parking kiosk 17, as well as through a parking appliance (not shown), which includes the motorist contacting the parking services and the parking services contacting the motorist, either personally or through a broadcast message, as permitted by the motorist. Off-site, such as from a delivery vehicle that is en route, motorists can interact with the centralized parking services through a virtual overlay communications device 21, such as a GPS device, a mobile phone, or other similar onboard or vehicle-mounted devices. In addition, when a motorist has a virtual overlay communications device and provides contact information, the parking service 33 could initiate communication with a motorist to provide an update on a waitlisted parking reservation request or other type of authorized parking status. Still other devices with which to interact with the parking services are possible.

Mixed Use Parking Scenarios

Commercial districts frequently provide mixed uses of parking spaces 13a-c. Some cities regulate loading zones by limiting the hours during which deliveries can be made, while other cities allocate a few parking spaces 13a-c as loading zones, sometimes using marked curbs and signs to designate their special status. When the regulations for using a parking space 13a-c become too complex, with restrictions about particular days and holidays and specific hours in addition to requirements for permits and other limitations, drivers may fail to understand the rules that apply in the moment. Furthermore, fixed parking signs do not provide flexibility to change usage rules dynamically according to varying demand during a day and bollards require significant physical infrastructure to control and deploy. Mixed use parking, through the centralized management of the parking spaces 13a-c, allows parking state to be readily changed between loading zone and public parking and thereby alleviates existing complexities.

Just-in-Time Parking Reservation Scenario

Mixed use parking includes two forms of parking reservations that are made in advance of vehicle 11 arrival. First, loading zone parking can be requested on-the-fly whilst a commercial driver is driving a delivery route through "just-in-time" parking reservation requests. An example parking scenario can help illustrate.

10:00 AM Joe is making deliveries all morning in his large delivery truck. After he has completed his delivery at 12$^{th}$ and Middlefield, Joe clicks on his handheld device. His next delivery is on Broadway and 7$^{th}$ Avenue. The handheld device sends a message to the parking services server, sending Joe's current location, indicating completion of the current delivery, and indicating Joe's next delivery destination. Routing software estimates that, under current traffic conditions, Joe will arrive at his next delivery destination in 30 minutes. The handheld device requests a 20-minute "long space" parking reservation for a simple delivery, which asks for two adjacent parking spaces at Broadway and 7$^{th}$ Avenue to accommodate Joe's truck. Joe starts driving to his next delivery destination.

The parking services server notices that adjacent parking spaces #1 and #2 at Broadway and 7$^{th}$ Avenue are available at 10:30 AM and confirms Joe's "long space" parking reservation request.

Parking is usually in demand in the morning on Broadway. The parking policies for parking spaces #1 and #2 on Broadway and 7$^{th}$ Avenue support mixed use. These parking spaces are available to the public for short-term parking (15 minutes maximum), but can be reserved for use as a loading zone for up to an hour.

10:10 AM Bob is driving his car down Broadway. He wants to make a stop at the bank. The parking meter on space #1 says, "Short Term Parking Only" with availability of 15 minutes. Bob parks and pays a small parking fee. The parking meter switches to display, "Paid." The parking services server offers to send reminder messages to Bob to move his car when his short-term parking time is expired.

10:11 AM The GPS device on Joe's truck reports his location to the parking services server. However, traffic is a heavy and the parking services server notices that Joe is now 20 minutes away from his reserved parking spaces.

10:15 AM The parking services server estimates that Joe is now 15 minutes away. The parking policy prohibits parking in a mixed use parking space when a reserving driver is expected to arrive within 15 minutes. The parking services server sends a message to the parking meter for space #2 to display, "Reserved Loading Zone."

10:23 AM Bob returns to his car and leaves. The vehicle occupancy sensor on the parking meter detects that Bob's car has left space #1 and the parking meter sends a message to the parking services server indicating that the parking space is no longer occupied.

The parking services server notices that Joe has a reservation for parking space #1 and is due to arrive in seven minutes. The parking services server sends a message to the parking meter for space #1 to display, "Reserved Loading Zone" to warn off other motorists looking for parking. Parking spaces #1 and #2 are now empty and waiting for Joe's arrival.

10:30 AM Joe arrives at Broadway and 7$^{th}$ Avenue. His GPS device indicates that he has parking reservations for parking spaces #1 and #2. He sees the empty parking spaces, both marked as "Reserved Loading Zone." Joe parks and uses his handheld device to check in. The handheld device informs the parking services server of Joe's arrival. The parking services server confirms Joe's identity, reservation and payment status. The parking services server sends a message to the parking meters for spaces #1 and #2 to indicate, "Paid Loading Zone."

The foregoing scenario demonstrates how parking space reservations for loading zones can be made dynamically on-the-fly as delivery vehicles 11 approach their next delivery destinations. By allocating mixed use parking spaces 13a-c for short-term parking only, the system ensures the availability of the parking spaces 13a-c as reserved loading zones. Parking availability indicators 15a-c on the meters or on other dynamic signage 19, or bollards 23a-c, where used, inform drivers when the mixed use parking spaces 13a-c are available.

The scenario also illustrates how adjacent parking spaces 13a-c can be reserved. The parking services server maintains a list of which parking spaces are adjacent. In the scenario, a double-sized "long space" is reserved as a pair of adjacent parking spaces 13a-b; the system ensures that both of the parking spaces 13a-b are made available to the driver to accommodate the long delivery vehicle.

To enable the orchestration of just-in-time parking reservations and mixed use parking, information about a delivery vehicle's planned destinations and routing are obtained and continually updated. In one embodiment, an onboard navigation system, such as a GPS device, informs the parking services server of the vehicle's current location and next delivery destination. The system then obtains traffic updates and performs route planning. In a further embodiment, the parking services server stores the vehicle's planned delivery route and only needs to know the vehicle's current location. In a still further embodiment, the traffic information, route planning, and current status could be distributed across multiple servers or systems.

The state maintained by centralized parking services for each parking space 13a-c allows short-term parking to be extended, when permitted by applicable parking policies, in comparable short-term increments, provided that there are no pending parking reservations. This feature can provide convenience to motorists who are already parked if they need additional parking time, although the feature concomitantly works against encouraging parking turnover and enhancing parking availability for motorists with short errands.

The state maintained by centralized parking services for each parking space 13a-c also allows an incoming delivery driver to be warned if another motorist is "squatting," that is, illegally parked, in or is late in leaving from his allocated reserved parking space 13a-c. The system could take measures to discourage squatting, such as collecting data about the offender's vehicle and gathering photographic evidence for a parking citation, along with providing the amount of the parking fine to be assessed against the squatter. The system could also make a substitute parking reservation nearby and offer compensation, if appropriate, for the inconvenience.

Early Parking Reservation Scenario

Loading zone parking can also be requested ahead of time by a commercial driver or delivery company through early parking reservation requests. In one variation, the reserver pre-books a loading zone location by asking for priority to park in the loading zone in a period of time. The precise parking time is booked as the delivery vehicle gets near, but the reserver pays for priority to park in the loading zone over an extended interval. Booking of the exact start time occurs when the delivery vehicle gets close enough to the delivery zone to remove uncertainty as to actual time of arrival. This scenario illustrates interactions between early reservations and just-in-time reservations for loading zones.

8:00 AM Jack is planning some morning deliveries. His main concern is a delivery at about 11:00 AM at Flood and Water Street in the financial district, where parking is often difficult. Jack uses his parking reservation application to reserve a convenient loading zone. Predicting exact arrival time is difficult, so he reserves parking space #1 from 10:30 AM to 11:30 AM to get a large prioritized window. He will need the parking space for about 15 minutes, but he is unsure exactly when he will arrive.

8:30 AM Jack starts his delivery route.

10:00 AM A second delivery driver, Bob, is also making deliveries near the financial district. Like Jack, he wants to make a delivery at Flood and Water. Bob is about 20 minutes away. Using his GPS device, he requests a loading zone at Flood and Water. The parking services server cannot guarantee parking for Bob at 10:20 AM, which is when Bob is expected to arrive, due to other pending parking reservations. Instead, the parking services server offers a parking space at Flood and High. Bob accepts the just-in-time parking reservation, but requests an upgrade of a closer parking space if available while he is en route. Bob indicates that he needs the parking space for 10 minutes.

10:15 AM Jack is running late. His next delivery destination is at Flood and High, but based on traffic, the system estimates that he is at least 30 minutes away.

The parking services server notices that there is time for Bob to unload at Flood and Water, provided that he keeps his delivery time to 10 minutes. Noticing that Bob has requested an upgrade, the parking services server offers parking space #1 at Flood and Water Street to Bob, with a warning that a failure to leave on time will result in a $200 penalty, charged automatically to his account.

10:16 AM Bob receives the offer on his GPS device. He is confident that he can complete his delivery in 10 minutes and gives a voice confirmation of acceptance. He drives to space #1 at Flood and Water. The parking services server acknowledges Bob's confirmation and reserves the parking space at Flood and Water for 10 minutes at 10:20 AM.

10:20 AM Bob arrives at parking space #1. The vehicle occupancy sensor at the parking meter detects his arrival and reports to the parking services server that the parking space is now occupied. Bob checks in using his mobile device and gets the package ready for delivery.

10:25 AM Bob completes his delivery. The vehicle occupancy sensor informs the parking services server as Bob leaves.

The parking services server sends a message to the parking meter for space #1 to display, "Reserved Loading Zone," holding the parking space for Jack.

10:30 AM The GPS device in Jack's vehicle reports directly in to the parking services server, which estimates that Jack is about 15 minutes away.

10:40 AM Jack arrives at parking space #1. His vehicle is detected and he checks in with a mobile device. The parking services server sends a message to the parking meter for space #1 to display, "Paid."

11:00 AM Jack completes his delivery. The vehicle occupancy sensor informs the parking services server as Jack leaves.

The parking server records that Jack's reservation is complete. The remainder of Jack's priority interval is returned to the pool of available parking. The parking services server can now accept other parking reservations before 11:30 AM for space #1 at Flood and Water Street.

The foregoing scenario demonstrates the interplay between parking space reservations booked in advance and reservations made just-in-time as vehicles approach. Here, the parking policy is set to prioritize the earliest reservations, which gives a first reserver priority for a potentially short use, but over a long time interval, recognizing that the actual delivery time is initially unknown. As this type of parking reservation can potentially tie up a parking space for a longer period of time, a special usage fee could be assessed for the convenience. The parking duration can also be automatically shortened based on actual arrival time to avoid tying up the parking space for an excessively long and unnecessary time period. If a second reserver wants to reserve that parking space, the reservation request is denied if the second reserver is expected to arrive during the earlier requested time period. The second reserver can request an upgrade notification if the parking space becomes available, for instance, where the first reserver is running late and the second reserver promises to leave well ahead of the belated arrival time of the first reserver. Alternatively, the second reserver can request an availability notification, which is a form of waitlisted parking reservation request for delivery drivers, if the parking space becomes available due to a cancelation by the first reserver or other circumstances that free up the desired parking space, such as the first reserver rescheduling his just-in-time parking reservation, there by making his original parking time clear of the second reserver's parking reservation request. The policy can also require that the second reserver accept the risk of a substantial penalty or fine if he fails to leave on time.

Components

Figure 2:
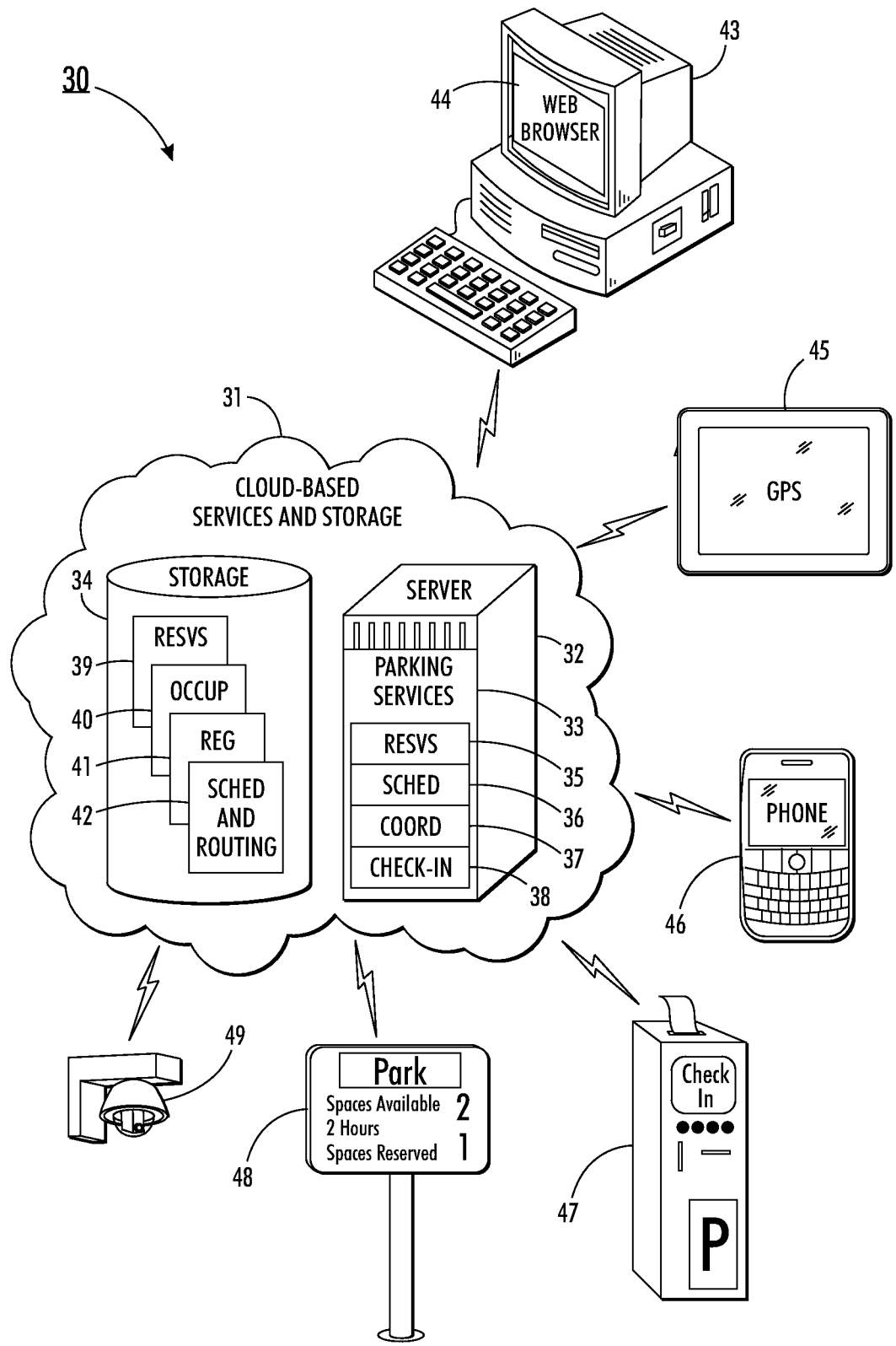
FIG. 2 is a functional block diagram showing the components of the system of FIG. 1.

Parking management and reservation services ("parking services") are adaptable to operating on different configurations of parking support equipment. The parking services are provided through a centrally-managed hub from which a range of different types of components provide vehicle occupancy inputs and user outputs for creating parking reservations and displaying parking status. FIG. 2 is a functional block diagram showing the components 30 of the system 10 of FIG. 1. The parking services 33 rely upon identifying which motorists or vehicles are en route, arriving, occupying, and departing, which enables the parking services 33 to account for charges properly upon vehicle departure. In one embodiment, a motorist checks-in to a particular parking space 13a-c ("pay-by-space") when parking and vehicle occupancy sensors identify when the vehicle 11 leaves the parking space 13a-c. In a further embodiment, parking reservations are assigned by location and a motorist checks-in to a parking pool 12 of parking spaces 13a-c ("pay-by-pool" or "pay-by-location") and vehicle occupancy sensors identify when the vehicle 11 leaves from the parking space 13a-c within the parking pool 12.

The parking services 33 are provided through centrally-operated parking servers 32 that can be remotely accessed by users over a wide area public data communications network, such as the Internet, using wired or wireless connections. The parking services 33 are server-based and implemented on the parking servers 32, which may be provided through cloud-based services 31 or by dedicated servers (not shown). Similarly, storage of parking data may also be provided through cloud-based storage 34 or by dedicated storage (not shown). The parking servers 32 communicate with governmental transportation department officials or their equivalent for setting parking policies, enforcing parking regulations, prohibitions and, if applicable, local restrictions and monitoring system performance. In addition, the parking servers 32 can communicate with private and commercial drivers, city residents, merchants, parking enforcement officers, and other stakeholders for the various types of parking services provided.

These users can communicate with and provide payment to the parking services 33 through various types of devices, depending upon the location of the user, the context of the communications and, if applicable, form of payment. To request parking reservations or interact with parking services 33, users can access the parking servers 32 through, for instance, a personal or tablet computer 43 using a Web browser or similar application 44, a GPS device 45 with a parking application, a parking application on a wireless mobile device 46, such as a smart phone or similar wireless-capable and Web-enabled device, and a parking meter or appliance 47 located at curbside or near to the parking spaces 13a-c, for instance, on a sidewalk. Payment in currency can be collected at curbside by the parking meter or appliance 43 and payment, including preauthorizations for parking, using an electronic form of payment, such as a credit or debit card, can be collected at curbside or remotely by the parking services 33. Other types of fixed or mobile user communication devices are possible.

The parking servers 32 maintain lists or databases of parking data, which may be changed by the parking services 33 as needed. The parking data includes a set of parking reservations ("Resys") 39 for parking at future times or on-the-fly just-in-time parking; parking space occupancy data ("Occup") 40 indicating which parking spaces are currently occupied by a vehicle; a set of parking time regulations ("Regs") 41 that typically apply to all of the parking spaces; and, optionally, scheduling and routing information ("Sched And Routing") 42 for commercial delivery drivers. The scheduling and routing information 42 could also be maintained by a device onboard the delivery vehicle used by the driver, such as a smart phone or tablet or notebook computer. Other parking data may also be stored for use by parking services 33, including a waitlist of parking reservation requests that have not yet been fulfilled or requests to extend the time on an existing parking reservation and contact information for drivers to notify them of reservation status, waitlist status, changing fee structures, or other relevant information, as appropriate to the type of parking reservation desired.

The status of parking is provided through dynamic signage 48 that is also located at curbside or nearby. The dynamic signage 48 can be a single sign or separate signs associated with individual parking spaces 13a-c, such as provided on a parking meter or appliance. Other types of dynamic signage are possible.

The parking services 33 tracks the occupancy state of parking spaces 13a-c, both individually and, in a further embodiment, as part of a parking pool 12, through vehicle occupancy sensors 45, such as video or still cameras, magnetic sensors, or ultrasonic sensors, located at curbside or nearby. Each vehicle occupancy sensor 45 determines whether one or more parking spaces 13a-c is currently occupied by a vehicle 11 or is available for parking. One vehicle occupancy sensor 45 can be assigned to each parking space 13a-c or a single vehicle occupancy sensor 45 can be deployed to monitor several parking spaces 13a-c, such as the parking spaces 13a-c. Other types of vehicle occupancy sensors are possible.

In use, parking services installations can combine different configurations of parking support equipment for different areas in a city or urban area. For example, some city blocks may be configured with a multi-space parking appliance on each city block face, while other city blocks may include simple single-space parking appliances for managing curbcut parking or loading zones. Other city blocks may use a combination of multi- and single-space parking appliances. As well, some city blocks may have dynamic signage or multi-space parking appliances. Any city block may be served by mobile applications. Different types vehicle occupancy sensors for measuring vehicle occupancy could be used throughout.

The parking services 33 include several modules to support mixed use parking, which could be implemented on the parking servers 32 or distributed over different server configurations. First, a reservations module 35 processes parking reservation requests, including identifying available parking spaces 13b-c and available parking times, as well as identifying alternative parking options when a parking reservation request cannot be fulfilled. Loading zones can be reserved through the reservations system module 35 using either an independent spaces approach, such as described in U.S. Patent application Publication No.: 2012/0092190, cited supra, or through an interchangeably reservable parking spaces approach that reserves parking in parking pools, such as described in commonly-assigned U.S. Patent application, entitled, "Computer-Implemented System And Method For Managing Interchangeable Parking Spaces," Ser. No. 13/624, 876, cited supra. An interchangeable parking spaces approach for provides more flexible parking allocation and higher parking utilization than reserving spaces independently. Contrarily, reserving loading zone spaces independently guarantees closer loading zones to commercial delivery drivers. In either approach, large delivery vehicles are allowed to reserve two or more adjacent parking spaces as a unit.

A scheduling and routing module 36 keeps track of delivery routes for planned commercial deliveries. Alternatively, the scheduling and routing can be performed by a device that is onboard a delivery vehicle 11, such as a smart phone or tablet or notebook computer, or by a combination of the scheduling and routing module 36 and the onboard device. Whether performed by the scheduling and routing module 36 or an onboard device, each delivery vehicles' progress on delivery routes is tracked with the assistance of the vehicle's onboard navigational system 22 to help estimate delivery and pick-up times. Tracking delivery vehicles and dynamically changing parking availability indicators 15a-c, 19 keep parking spaces available for short-term parking, until a delivery vehicle 11 is near, thereby increasing parking space utilization.

A coordination and communication module 37 estimates the amount of time before a delivery vehicle 11 will arrive at a loading zone. Based on the estimate, the parking servers 32 can instruct parking meters 14a-c, 18 and appliances to change their respective associate dynamic signage 15*a*-*c*, 19 to appropriately inform other drivers to not use the parking spaces 13*a*-*c* when a delivery is imminent.

Finally, a check-in and arrival confirmation module 38 communicates with delivery drivers, who signal their arrival at a loading zone and check in to their parking reservation. Vehicle occupancy sensors 16*a*-*c*, 20 typically only indicate that a vehicle 11 is occupying a parking space 13*a*-*c*, but not to whom the vehicle belongs. As a result, a vehicle's driver must perform a check-in and arrival confirmation with the check-in and arrival confirmation module 38 to notify the parking services 33 of their identity, which is matched to the parking reservation. Check-in and arrival confirmation can be signaled by a driver using a device, such as by a mobile phone executing a check-in application, with a vehicle-mounted device, such as the navigational system 22, by manually operating a parking meter 14*a*-*c* 18 or appliance, or via an automatic license recognition system, which confirms that the expected vehicle has parked in the loading zone. The reservations module 35 uses an arrival transaction to confirm that the vehicle 11 using the loading zone is the vehicle 11 corresponding to the loading zone reservation. In a further embodiment, the driver could also use the device to signal to the parking services 33 that some other vehicle 11 is blocking the loading zone.

In a further embodiment, the parking services 33 could place a limit on the total number of reservations that one driver can make in a given period of time to prevent abuse of the reservations system and preclude illicit financial gain by booking more time than needed, with exceptions to the limit granted to delivery drivers or other motorists who have a bona fide need to park frequently. This limit can be enforced using the driver's name, credit card, vehicle identifying information, such as license plate, or other identifying information. Still other abuse prevention mechanisms are possible.

Parking Services Methodology

Just-in-time parking reservations are supported through the use of onboard location sensors, generally GPS devices, and scheduling and routing information that together allow the parking services 33 to make loading zone parking available with efficient mixed use utilization between deliveries. The mixed use policy for loading zone spaces as short-term parking also enables rapid switching between uses. As well, knowing onboard location and scheduling and routing information accommodates early reserver reservations with priority loading zone access over a long parking interval with short-term parking permitted if the reserver is delayed, even during the reserved time.

Mixed Use Parking Methodology

Figure 3:
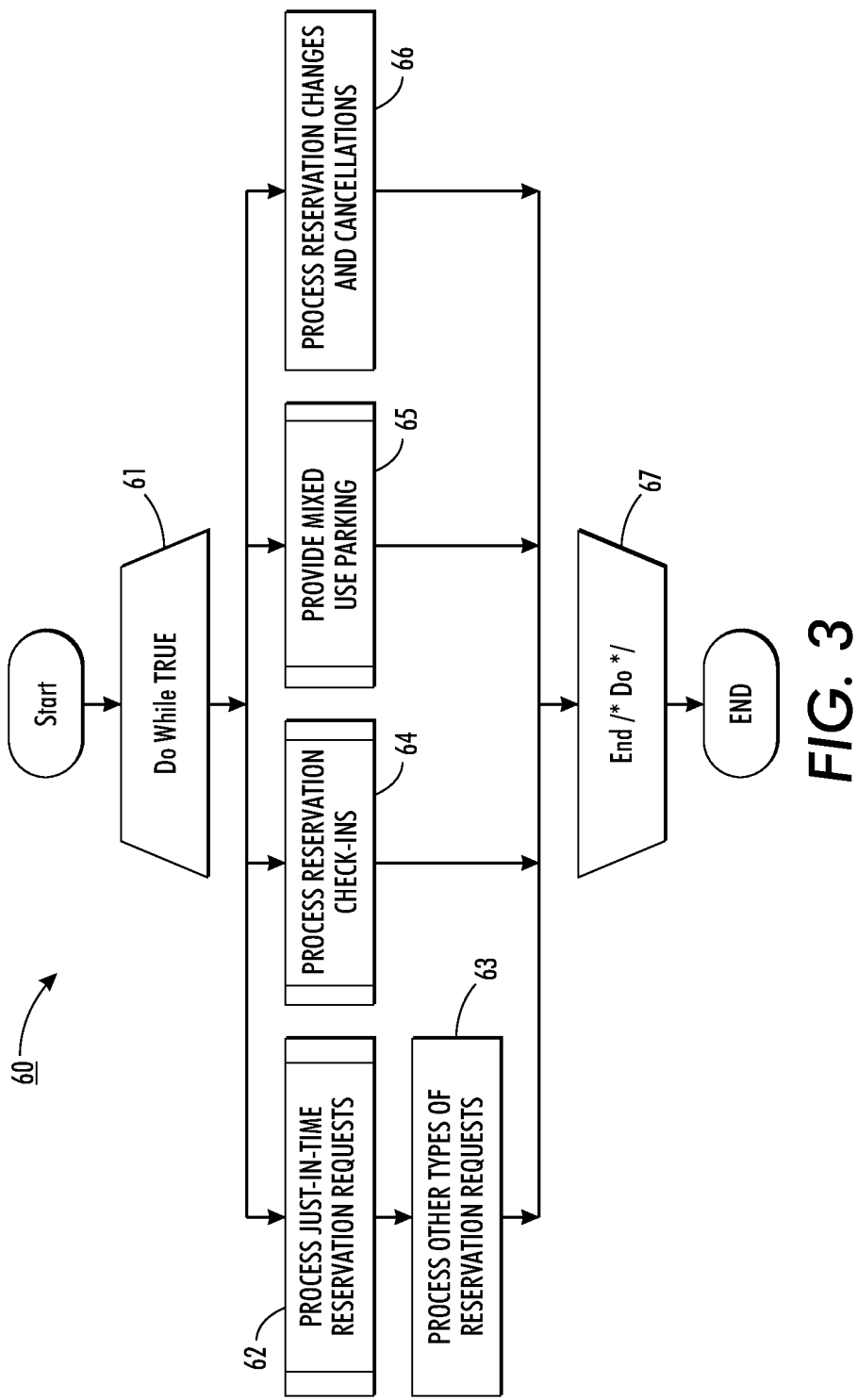
FIG. 3 is a flow diagram showing a computer-implemented method for providing just-in-time loading zone parking in accordance with one embodiment.

Commercial delivery loading zones are centrally managed to facilitate just-in-time and mixed use parking. FIG. 3 is a flow diagram showing a computer-implemented method 60 for providing just-in-time loading zone parking in accordance with one embodiment. The method 60 is performed as a series of process steps by the parking servers 32 (shown in FIG. 2) or other computing devices in collaboration with driver devices, plus onboard location sensors, check-in and confirmation devices, parking meters or appliances, deployed dynamic signage, and vehicle occupancy sensors.

Loading zone parking is managed by handling three concurrent sets of processes (steps 61-67) as follows. In one set of processes, just-in-time parking reservation requests are received and booked (step 62), as further described below with reference to FIG. 4, as well as other types of parking reservation requests (step 63), including early parking and non-delivery parking reservation requests. In a second set of processes, parking reservation check-ins and confirmations are handled (step 64), as further described below with reference to FIG. 6. In a third set of processes, mixed use parking is provided (step 65), as further described below with reference to FIG. 7. Finally, in a fourth set of processes, changes to booked parking reservations are processed (step 66). Scheduling changes to booked parking reservations are only permitted under the same criteria applied when originally granted. Specifically, a parking reservation may be changed if the parking spaces 13*b*-*c* at the new start time are physically available based on both any unfulfilled pending parking reservations, that is, parking reservations that have not yet started, and any parking spaces in the desired parking pool that are currently occupied by another vehicle, as well as being permitted by any applicable parking regulations and prohibitions and local restrictions. Scheduling changes can include requesting additional or less parking time, rescheduling or postponing a booked parking reservation, and canceling a booked reservation. In addition, the requestors of any waitlisted parking reservation requests that have not yet been fulfilled or extended are notified if a change or cancellation of a booked reservation makes granting of the waitlisted parking reservation request possible, assuming that the requestor has not preauthorized acceptance and payment. Other types of changes to booked parking reservations are possible. Other sets of concurrent processes are possible. The first three sets of processes will now be discussed in detail.

Processing Just-in-Time Reservations

Figure 4:
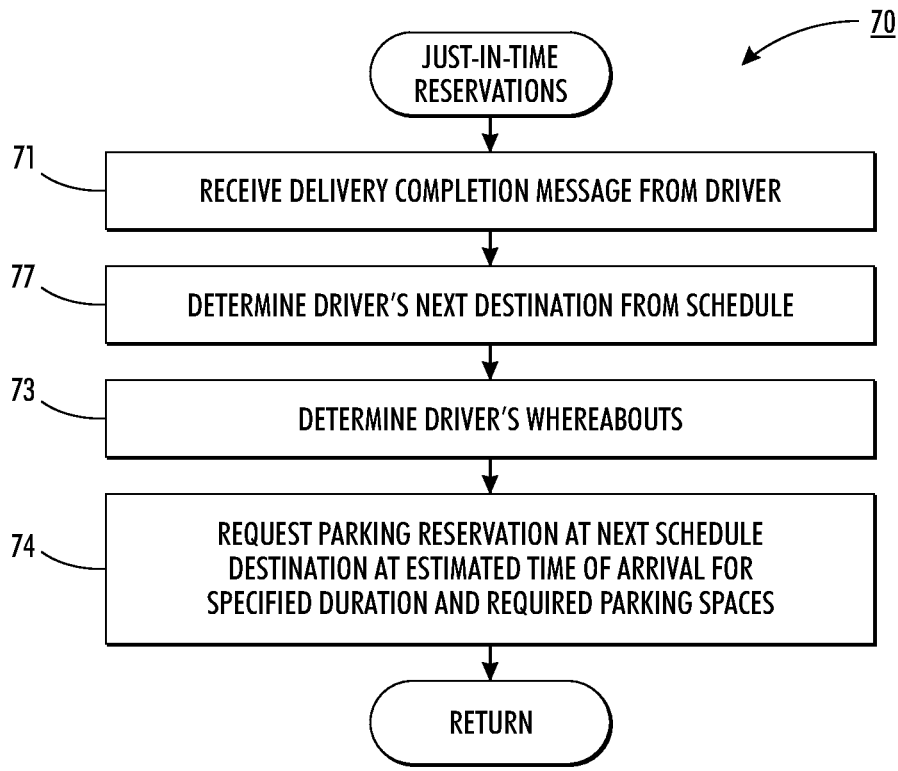
FIG. 4 is a flow diagram showing a routine for processing just-in-time reservation requests for use in the method of FIG. 3.

Loading zone parking can be requested on-the-fly whilst a commercial driver is driving a delivery route through "just-in-time" parking reservation requests. FIG. 4 is a flow diagram showing a routine 70 for processing just-in-time reservation requests for use in the method 60 of FIG. 3. Processing can either be performed by the scheduling and routing module 36, by a device that is onboard a delivery vehicle 11, such as a smart phone or tablet or notebook computer, or both. A just-in-time reservation request begins upon receiving a message indicating delivery completion from the driver (step 71). The driver's next delivery destination is determined (step 77) from the scheduling and routing information 42, whether stored by the parking server 32 or as maintained by the onboard device. The driver's whereabouts is determined (step 73), as further described infra with reference to FIG. 5. Finally, a just-in-time parking reservation is requested from the reservations module 35 (step 74), which includes the next scheduled destination at an estimated time of arrival based on the driver's whereabouts for a specified duration, generally less than an hour, and, optionally, for a required number of parking spaces 13*a*-*c*, if the delivery vehicle is long.

Determining Driver Location

Figure 5:
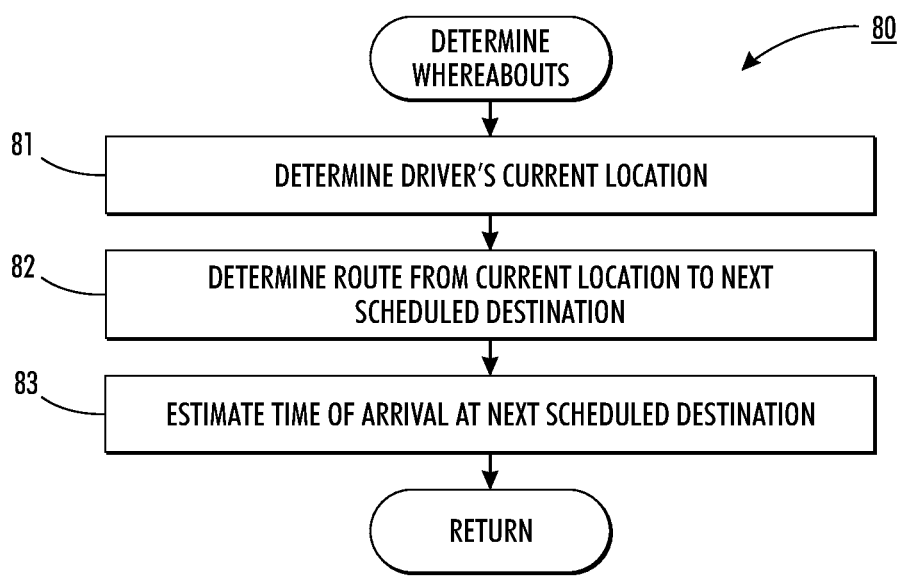
FIG. 5 is a flow diagram showing a routine for determining a driver's whereabouts for use in the routines of FIGS. 4 and 7.

The parking services 33 requires the location of each driver to help estimate delivery and pick-up times and accommodate mixed use parking. FIG. 5 is a flow diagram showing a routine 80 for determining a driver's whereabouts for use in the routines of FIGS. 4 and 7. First, the driver's current location is determined (step 81), generally with the assistance of the vehicle's onboard navigational system 22, although current location could also be determined using other techniques, such as Wi-Fi triangulation. The route from the driver's current location to the next scheduled delivery destination is determined (step 82). The route could be established using an online mapping and routing service or application, and could also factor in real time traffic, construction, and other updates, that could impact the driver's route. Finally, based on the driver's current location and inbound route, a time of arrival at the next scheduled destination is estimated (step 83).

Processing Reservation Check-Ins and Confirmations

Figure 6:
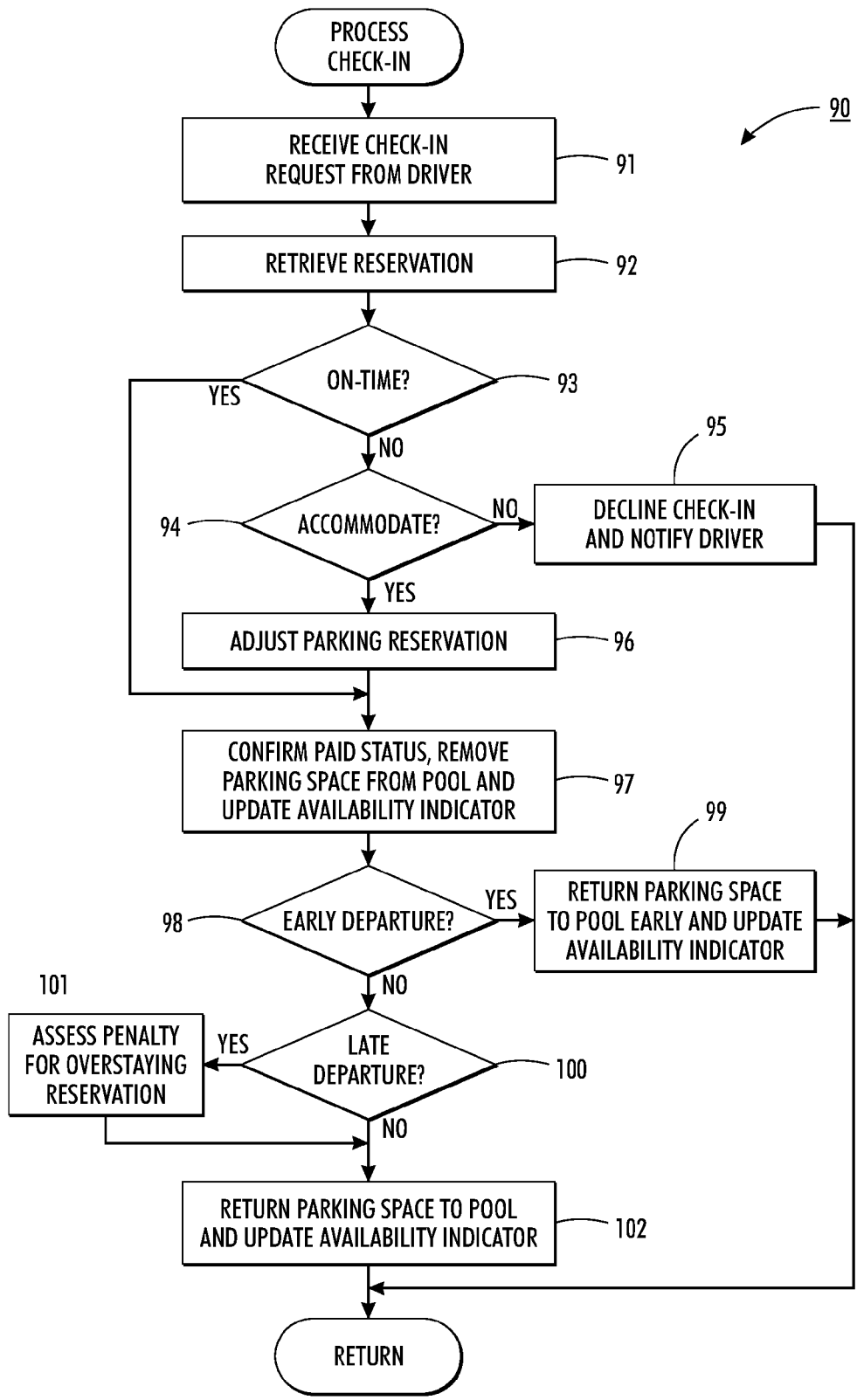
FIG. 6 is a flow diagram showing a routine for processing reservation check-ins for use in the method of FIG. 3.

Loading zone parking can also be requested ahead of time by a commercial driver through early parking reservation requests. FIG. 6 is a flow diagram showing a routine 90 for processing reservation check-ins for use in the method 60 of FIG. 3. A check-in request is first received from a driver (step 91) using a device, as described supra. The driver's parking reservation 39 is retrieved (step 92). If the driver is on-time (step 93), the reservation and paid status are confirmed, the parking space 13a-c is removed from the pool of available parking, and the parking availability indicator 15a-c, 19 is updated to indicate that the parking space is in use (step 97).

Otherwise, if the driver is either early or late, the parking services 33 evaluates whether parking can be accommodated (step 94) based on inter alia applicable parking regulations 41 and any local restrictions, other pending reservations 39 and, if pooled parking, current occupancy 40. If early or late parking can be accommodated (step 94), the driver's parking reservation is adjusted (step 96) and reservation confirmation proceeds (step 97). Otherwise, when accommodation is not possible (step 94), check-in is declined and the driver is notified (step 95).

The driver parks and, at some point, leaves. If the driver is departing early (step 98), the parking space 13a-c is returned to the pool of available parking, thereby making the parking space 13a-c available for use by other motorists early, and the parking availability indicator 15a-c, 19 is updated to indicate that the parking space is available (step 99). Conversely, if the driver is departing late (and has not been notified or otherwise dealt with) (step 100), a penalty for overstaying the parking reservation may be assessed (step 101), among other negative dispositions. Finally, whether the motorist is departing on-time or late, the parking space 13a-c is returned to the pool of available parking and the parking availability indicator 15a-c, 19 is updated to indicate that the parking space is available (step 102).

Providing Mixed Use Parking

Figure 7:
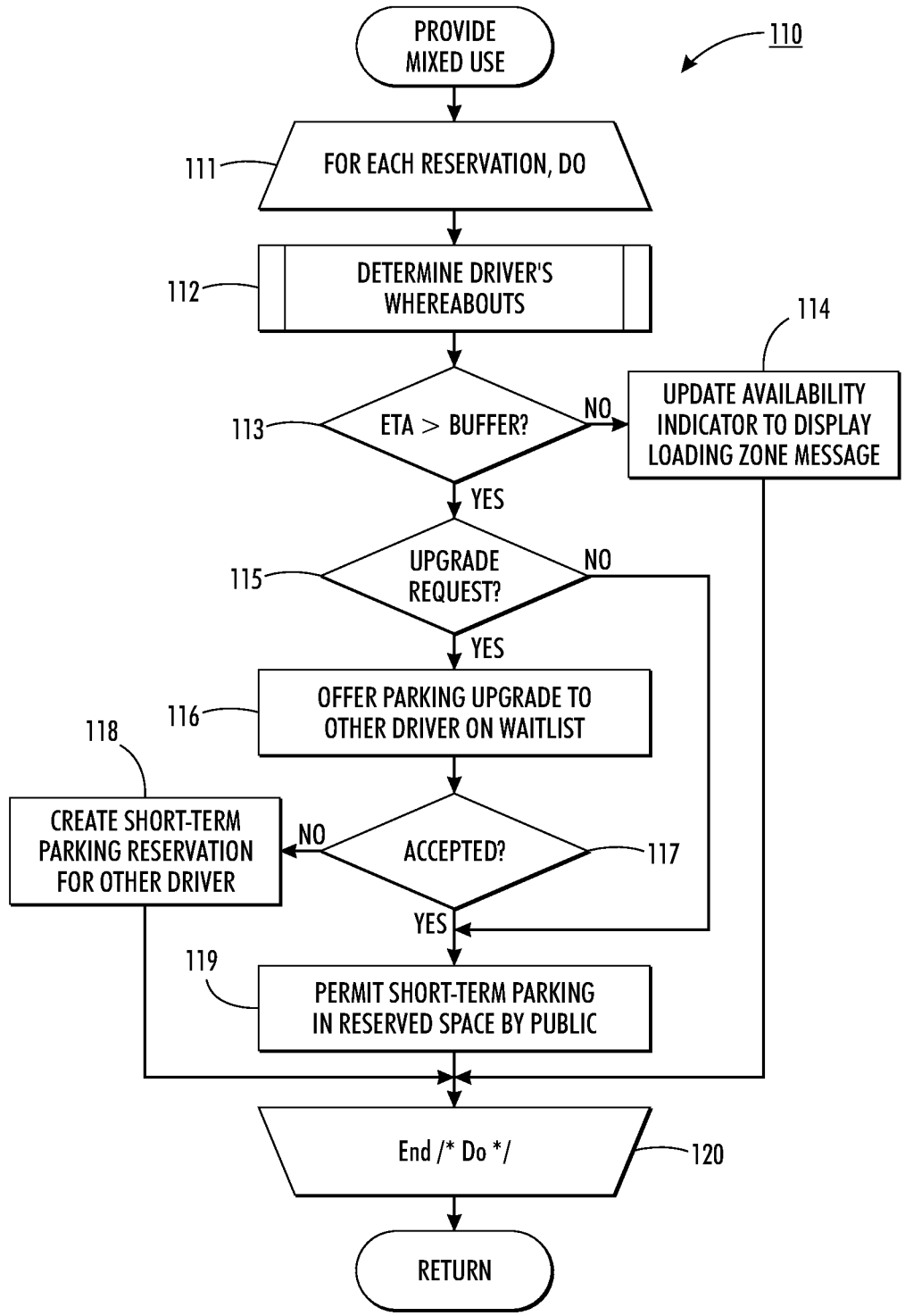
FIG. 7 is a flow diagram showing a routine for providing mixed use parking for use in the method of FIG. 3.

Conventional first-come, first-served on-street public parking is offered through short-term parking that is provided in between scheduled or just-in-time loading zone uses. FIG. 7 is a flow diagram showing a routine 110 for providing mixed use parking for use in the method 60 of FIG. 3. Each of the pending parking reservations is continually evaluated (steps 111-120) as follows. First, the whereabouts of the driver to whom the parking reservation corresponds is determined (step 112), as described supra. If the amount of time until the driver's estimated time of arrival ("ETA") is within a pre-reservation time buffer (step 113), such as where a parking policy prohibits parking in a mixed use parking space when a reserving driver is expected to arrive within 15 minutes, the parking space 13a-c is removed from the pool of available parking and the parking availability indicator 15a-c, 19 is updated to indicate that the parking space is reserved for use as a loading zone and unavailable for parking (step 114).

Otherwise, if the amount of time until the driver's ETA is greater than the pre-reservation time buffer (step 113), mixed use parking is permitted. If there is any other driver who has been placed on the waitlist for mixed use parking in the loading zone (step 115), the parking services 33 offers parking in the loading zone to the other driver (step 116), provided that the other driver's estimated time of arrival and requested parking duration allow the loading zone to be occupied and freed up in time for the original driver's belated arrival. If the other driver accepts the parking offer (step 117), a short-term parking reservation is created for that other driver, the parking space 13a-c is removed from the pool of available parking and the parking availability indicator 15a-c, 19 is updated to indicate that the parking space is reserved and unavailable for parking (step 118). Otherwise, if the other driver declines the parking offer (step 117), open short-term parking is permitted by the public (step 119).

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method remotely providing just-in-time loading zone parking reservations over a communications network, comprising executing on a processor the steps of:

determining in a computer with a memory a next delivery destination in the memory for a delivery driver;

booking a just-in-time parking reservation for the delivery driver in the memory, comprising the steps of:

selecting a parking location that is physically proximate to the next delivery destination in the memory and designating a start time for the selected parking location in the memory; and based at least in part on selection of the parking location, remotely updating a driver-discernable parking availability indicator signage that is physically located near the selected parking location to indicate a loading zone that has been reserved for the delivery driver from the computer over a communications network;

continuously remotely ascertaining the delivery driver's progress from the computer over the communications network through a navigational system and estimating a time of arrival of the delivery driver at the selected parking location in the memory;

delaying the start time in the memory of the just-in-time parking reservation in the memory based on the estimated time of arrival in the memory;

determining an amount of time in the memory between the estimated time of arrival in the memory and the start time in the memory of the just-in-time parking reservation in the memory for parking in the selected parking location by drivers other than the delivery driver for a short term;

remotely updating the driver-discernable parking availability indicator signage that is physically located near the selected parking location to indicate that the selected parking location is available for parking for the short term from the computer over the communications network;

sensing remotely from the computer over the communications network occupancy of the parking location through an occupancy sensor that is physically located near the selected parking location and storing the occupancy in the memory;

accepting from the computer over the communications network a check-in in the memory to the selected parking location comprising an estimated time of departure when the estimated time of departure in the memory is prior to the delayed start time in the memory of the just-in-time parking reservation in the memory;

sensing remotely from the computer over the communications network vacancy of the parking location through the occupancy sensor that is physically located near the selected parking location; and remotely updating the driver-discernable parking availability indicator signage that is physically located near the selected parking location to indicate the loading zone that has again been reserved for the delivery driver from the computer over the communications network.

2. A method according to claim 1, further comprising method steps of:
- booking an early parking reservation in the memory at a planned delivery destination by the delivery driver, the early parking reservation in the memory comprising a planned parking location, start time and priority duration;
- confirming a check-in in the memory to the early parking reservation in the memory by the delivery driver upon arriving at the planned parking location; and
- adjusting the priority duration of the early parking reservation in the memory based on a time of actual arrival in the memory by the delivery driver and an actual delivery period in the memory.

3. A method according to claim 2, further comprising at least one method step of:
- processing the early parking reservation in the memory based on independently reservable parking spaces as tracked in the memory; and
- processing the early parking reservation in the memory based on pools of pluralities of parking spaces as tracked in the memory.

4. A method according to claim 1, further comprising method steps of:
- determining a current location of the delivery driver in the memory;
- determining a driving route to be taken by the delivery driver in the memory to the next delivery location in the memory; and
- estimating the time of arrival in the memory based on time required by the delivery driver to travel from the current location in the memory to the next delivery location in the memory using the driving route in the memory.

5. A method according to claim 4, further comprising a method step of:
- adjusting the driving route in the memory based on real time traffic, construction and updates that could impact the driving route in the memory as received by the computer over the communications network.

6. A method according to claim 1, further comprising method steps of:
- maintaining parking upgrade requests in the memory for parking availability in the selected parking location by other delivery drivers, each parking upgrade request in the memory comprising the parking location and a chosen start time for the selected parking location in the memory with a parking duration; and
- offering parking in the selected parking location to one of the other delivery drivers at the chosen start time in the memory if the delivery driver's just-in-time parking reservation in the memory is canceled or rescheduled clear of the other delivery driver's parking duration.

7. A method according to claim 1, further comprising method steps of:
- maintaining parking upgrade requests in the memory for parking upgrades by other delivery drivers, each parking upgrade request in the memory comprising the selected parking location with a parking duration and a different start time;
- estimating a separate time of arrival in the memory by one of the other delivery drivers at the selected parking location; and
- offering parking in the selected parking location to the other delivery driver at the different start time when the other delivery driver's estimated separate time of arrival in the memory and the parking duration in the parking upgrade request allow the selected parking location to be free prior to the start time in the memory.

8. A method according to claim 1, further comprising method steps of:
- including a parking duration in the just-in-time parking reservation in the memory;
- confirming a check-in in the memory to the just-in-time parking reservation in the memory by the delivery driver upon arriving at the selected parking location; and
- remotely updating the driver-discernable parking availability indicator signage that is physically located near the selected parking location to indicate that the selected parking location is available for parking for the short term from the computer over the communications network when the delivery driver leaves the selected parking location prior to expiry of the parking duration.

9. A method according to claim 1, further comprising at least one method step of:
- processing the just-in-time parking reservation in the memory based on independently-reservable parking spaces as tracked in the memory; and
- processing the just-in-time parking reservation in the memory based on pools of pluralities of parking spaces as tracked in the memory.

10. A method according to claim 1, further comprising a method step of:
- reserving a plurality of physically adjacent parking spaces at the selected parking location for the delivery driver.

11. A method according to claim 1, further comprising at least one method step of:
- dissuading parking in the selected parking location by other drivers by indicating unavailability proximal to the selected parking location; and
- preventing parking in the selected parking location by other drivers by physically deploying an obstruction to the selected parking location.

* * * * *